UNITED STATES PATENT OFFICE.

REINHOLD ROSTOCK, OF KLOSTERNEUBURG, AUSTRIA-HUNGARY.

METHOD OF PROVIDING CASKS WITH A COATING.

No. 884,993.　　　　　Specification of Letters Patent.　　　Patented April 14, 1908.

Application filed March 11, 1907. Serial No. 361,812.

*To all whom it may concern:*

Be it known that I, REINHOLD ROSTOCK, manufacturer of cement ware, a subject of the Emperor of Germany, residing in Klosterneuburg, near Vienna, Austria, have invented a Method for Providing Cement or Concrete Casks with a Protective Coating; and I do hereby declare the following to be a full, clear, and exact description of the invention, such as will enable others skilled in the art to which it appertains to make and use the same.

This invention relates to cement or concrete casks which are provided with an internal coating for the purpose of preventing the contents of the cask coming into contact with the cement or concrete, and being thereby deteriorated. Internal coatings of resin, varnish and the like has been directly applied to the cement or concrete, but it is found in practice that the coatings so applied are apt to scale off, so that the beer or other contents of the cask comes into direct contact with the cement or concrete, thereby deteriorating. In order to avoid this difficulty, a preliminary coating of great fluidity has been applied to the casks before the final coating was applied, the first coating entering into the pores of the cement or concrete. This method however, did not fulfil the objects aimed at.

In order to provide a smooth, internal surface to which the coating or coatings will well adhere, it is necessary to first apply a lining of plaster, a plaster mixed with fibers being best adapted to be used for a lining.

According to the present invention, a lining of plaster is first applied, and then, before the actual protective coating is applied, a coating of great fluidity—such as asphalt, tar, and the like—is applied.

In carrying out the invention according to one mode, the cement or concrete cask is first provided, on the inside, with a lining of plaster—such as cement plaster magnesite plaster, hydraulic plaster, and the like—which in a known manner is mixed with mineral, vegetable, or animal fibers—such as asbestos, wood-fiber, cork, jute, ramie, linen, cotton, hairs of animals, and the like. After this lining is dry, it is covered with a coating of some material which is very fluid and which is adapted to unite with the plaster and the protective coating—such as asphalt, tar, and the like. When this coating is dry, the actual protective coating of pitch, resin, varnish, or the like is applied. By simultaneously combining these methods referred to—each of which is known in itself—a coating is obtained which will firmly adhere, and not scale off. As coatings of asphalt and tar do not penetrate the lining sufficiently, and consequently, easily scale off, especially in the case of mechanical influences, only forming a layer on top of the lining, the latter, instead of the asphalt or tar coating, may be impregnated with liquefied ozocerite and ceresin. By employing these materials, the lining is saturated with an inert substance, so that even the protective coating of resin, varnish, or the like may be dispensed with.

Having now particularly described and ascertained the nature of my said invention, and in what manner the same is to be performed, I declare that what I claim is:

1. A method of providing cement or concrete casks or the like with a protective coating, consisting in first lining the same with a plaster mixed with fibers, then impregnating the lining with a very fluid substance—such as asphalt, tar, and the like, and causing it to penetrate said lining and thus contact with the surface of the cask and finally applying the protective coating—such as resin, varnish, and the like.

2. A method of coating cement or concrete casks or the like which consists in first lining the cask with a plaster, then impregnating the lining with a very fluid substance adapted to unite with the protective coating and the plaster, and causing it to penetrate said lining and thus contact with the surface of the cask, and finally applying the protective coating, substantially as described.

Signed at the United States consulate-general in the city of Vienna, Austria this 23rd day of February, A. D. 1907.

REINHOLD ROSTOCK.

Witnesses:
　HARRY BELMONT,
　ALVESTO S. HOGUE.